United States Patent
Yoshino

(10) Patent No.: US 7,178,837 B2
(45) Date of Patent: Feb. 20, 2007

(54) PIPING JOINT STRUCTURE

(75) Inventor: Makoto Yoshino, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/130,343

(22) Filed: May 16, 2005

(65) Prior Publication Data
US 2005/0258644 A1    Nov. 24, 2005

(30) Foreign Application Priority Data
May 18, 2004   (JP)   ............................. 2004-148170

(51) Int. Cl.
*F16L 37/00*   (2006.01)
(52) U.S. Cl. ................. 285/305; 285/319; 285/374
(58) Field of Classification Search ............... 285/305, 285/307, 319, 374
See application file for complete search history.

(56) References Cited

U.S. PATENT DOCUMENTS

| | | | |
|---|---|---|---|
| 5,653,475 A * | 8/1997 | Scheyhing et al. | ......... 285/305 |
| 5,735,555 A * | 4/1998 | Answine et al. | ............ 285/319 |
| 5,765,877 A | 6/1998 | Sakane et al. | |
| 5,782,502 A * | 7/1998 | Lewis | .......................... 285/305 |
| 6,539,920 B1 * | 4/2003 | Spiers | ......................... 285/305 |
| 7,029,036 B2 * | 4/2006 | Andre | .......................... 285/319 |
| 2005/0110274 A1 | 5/2005 | Yoshino | |

FOREIGN PATENT DOCUMENTS

JP   62-181788   11/1987
JP   2004-183703   7/2004

* cited by examiner

*Primary Examiner*—David Bochna
(74) *Attorney, Agent, or Firm*—Harness, Dickey & Pierce, PLC

(57) ABSTRACT

A piping joint structure includes a first piping member, a second piping member having at least a window portion, and a joint member provided with a body unit and multiple engagement units, which protrude to the central axis side of the body unit and are capable of being diameter-enlarged and diameter-shortened. The body unit of the joint member has a semi-crack shape. The joint member hoops the second piping member from a periphery side of the second piping member, while the engagement units are inserted through the window portion. The first piping member is connected to the second piping member by a one-touch operation of diameter-enlarging and diameter-shortening of the engagement units.

12 Claims, 5 Drawing Sheets

PIPING JOINT STRUCTURE

CROSS REFERENCE TO RELATED APPLICATION

This application is based on Japanese Patent Application No. 2004-148170 filed on May 18, 2004, the disclosure of which is incorporated herein by reference.

FIELD OF THE INVENTION

The present invention relates to a piping joint structure for connecting pipes.

BACKGROUND OF THE INVENTION

Generally, a piping joint structure is provided for piping members (male piping member and female piping member) of a refrigerant cycle system. For example, an insertion portion at an end of the male piping member is inserted into a reception port at an end of the female piping member, while a ring-shaped fixing unit having a circumferential notch is arranged therebetween to axially restrain the male piping member.

In this case, the fixing unit is provided with an arc-shaped protrusion portion, which is inserted in a slot arranged at the reception port of the female piping member. A circular prominent portion is arranged at the insertion portion of the male piping member to be sandwiched between the arc-shaped protrusion portion and a reception surface of the female piping member. Thus, the male piping member is restricted from being disengaging from the female piping member.

However, in this case, the fixing unit is to contact the male and female piping members in a fixed right-left direction, otherwise the male piping member fails to be connected with the female piping member or a gap is caused therebetween.

SUMMARY OF THE INVENTION

Referring to JP-2004-183703A and JP application NO. 2003-394459 (U.S. application. Ser. No. 10/997,128 filed on Nov. 24, 2004) having the same inventor with the present invention, a piping joint structure is provided with a joint member for joining a male piping member and a female piping member. The joint member has a cylindrical body unit provided with first slot portions and second slot portions, which respectively axially extend from two axial ends of the body unit. The body unit is further provided with a pair of first engagement portions and a pair of second engagement portions, which are respectively arranged at the two axial ends and protrude to the side of the central axis of the body unit.

The joint member is attached to the first piping member through an engagement of the second engagement portions thereof with the first piping member. Then, the second piping member is inserted to the joint member while the first engagement portions of the joint member are flexed (diameter-enlarged). Thus, the second piping member is engaged with the joint member, and connected with the first piping member.

However, according to a review of the inventor, in this case, the second piping member is inserted through the first engagement portions of the joint member, while the first engagement portions are to be diametric-enlarged. Therefore, the mounting performance of the joint member is deteriorated. If the first engagement portion is diameter-enlarged to have a deformation exceeding an elastic range thereof, a plastic deformation will be caused in the first engagement portion, so that a faulty engagement with the second piping member occurs.

Furthermore, when the joint member is mounted at the first piping member, the protruding-direction end surfaces of the second engagement portions of the joint member will press-contact an airproofing unit (seal unit) arranged at the first piping member, thus damaging the seal unit. In a molding of the joint member, because a parting surface of a form block of the joint member is to contact the protruding-direction end surface of the engagement portion, a burr or the like may be caused at the protruding-direction end surface to impair the seal unit.

In view of the above-described disadvantages, it is an object of the present invention to provide a piping joint structure having a joint member, which is readily mounted at pipes without damaging a seal unit thereof.

According to the present invention, a piping joint structure is provided with a first piping member having a male joint, a second piping member having a female joint, and a joint member including a body unit with an approximate cylinder shape and a plurality of engagement units (first engagement unit), which are disposed at an axial end of the body unit and protrude to a side of a central axis of the body unit. The engagement units are elastic at least in a protruding direction thereof. The body unit of the joint member has a plurality of slot portions, each of which has an opening at the axial end of the body unit to approximately axially extend to a part of the body unit. The slot portions are uniformly arranged at the body unit with respect to a circumference direction thereof, and have the openings disposed where the engagement units are not arranged. The body unit of the joint member has two diametrical ends, at least one of which is divided into two separate portions capable of being disengageably connected with each other. The joint member hoops an outer surface of the second piping member. The male joint of the first piping member is inserted into the female joint of the second piping member by a one-touch operation of diameter-enlarging and diameter-shortening of the engagement units.

Thus, the joint member can be more easily attached to the second piping member, as compared with a conventional attachment where the first engagement unit is diameter-enlarged so that the second piping member is inserted into the joint member. Moreover, because the joint member can be attached to the second piping member without diameter-enlarging the first engagement unit, thus reducing a defect caused by a deformation of the first engagement unit exceeding the elastic range thereof.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS (First Embodiment)

A piping joint structure according to a first embodiment of the present invention will be described with reference to FIGS. 1–6. The piping joint structure is suitably used for connecting a first piping member 2 and a second piping member 3 of a refrigerant cycle system in a vehicle air conditioner, for example.

Figure 1:
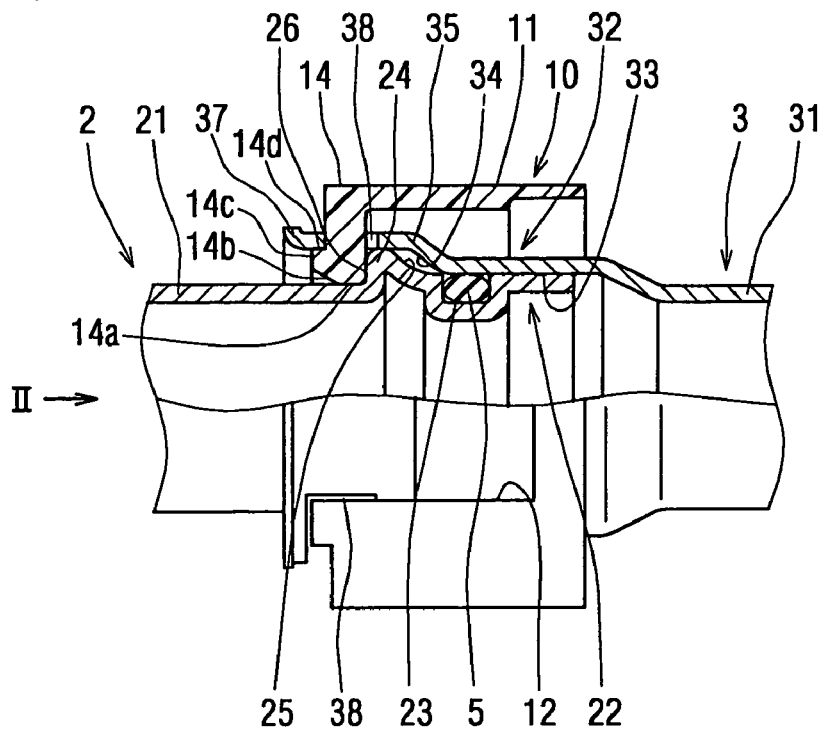
FIG. 1 is a partially cross-sectional view showing a whole construction of a piping joint structure according to a first embodiment of the present invention.

With reference to FIG. 1 showing the whole construction of the piping joint structure, the first piping member 2 has a male joint 22 which is inserted into a female joint 32 of the second piping member 3. A joint member 10 (engagement member) is attached to the second piping member 3, and engaged with the first piping member 2 through at least a window portion 38 (e.g., two window portions 38) arranged at the second piping member 3.

Specifically, the first piping member 2, in which fluid (e.g., refrigerant) flows, has a cylinder shape on the whole. The first piping member 2 includes a cylinder portion 21, which is provided with a diameter-enlarged end (male joint 22) at the side of the second piping member 3.

The male joint 22 has a cylinder-shaped axial end (at side of second piping member 3), which abuts on a groove 23 (concave portion) circumferentially extending to the whole male joint 22. A seal unit 5 (e.g., O-like ring) is arranged in the groove 23 and engaged with an inner surface thereof to seal the connection part of the piping members 2 and 3.

The male joint 22 is further provided with a diameter-enlarged portion 24 abutting on the cylinder portion 21 of the first piping member 2. A step-height surface (rear engagement surface 26) is formed at an end surface of the diameter-enlarged portion 24 of an opposite side to the second piping member 3.

A taper portion having a taper outer surface 25 is arranged at the male joint 22 and positioned between the diameter-enlarged portion 24 and the groove 23. The taper outer surface 25 tapers from the side of the diameter-enlarged portion 24 to the side of the groove 23.

Similarly, the second piping member 3, in which fluid (e.g., refrigerant) flows, has a cylinder shape on the whole. The second piping member 3 is provided with a cylinder portion 31, which has a diameter-enlarged end (female joint 32) at the side of the first piping member 2.

The female joint 32 has a cylinder-shape insertion port 33 abutting on the cylinder portion 31 of the second piping member 3. The cylinder-shaped axial end of the male joint 22 is accommodated in the insertion port 33 and engaged with an inner surface thereof.

The female joint 32 is further provided with a diameter-enlarged cylindrical portion 37 (extension portion 37) at the end of the female joint 32 of the side of the first piping member 2. A taper portion 35 is arranged between the insertion port 33 and the extension portion 37, and has a taper inner surface 34 tapering from the side of the extension portion 37 to the side of the insertion port 33. That is, the outer diameter of the extension portion 37 is equal to that of the end of the taper portion 35 of the side of the first piping member 2. The taper inner surface 34 is arranged to face the taper outer surface 25 of the first piping member 2.

The two window portions 38 (hole portions) are provided at the extension portion 37 of the female joint 32 and face each other with respect to the central axis of the second piping member 3.

Figure 2:
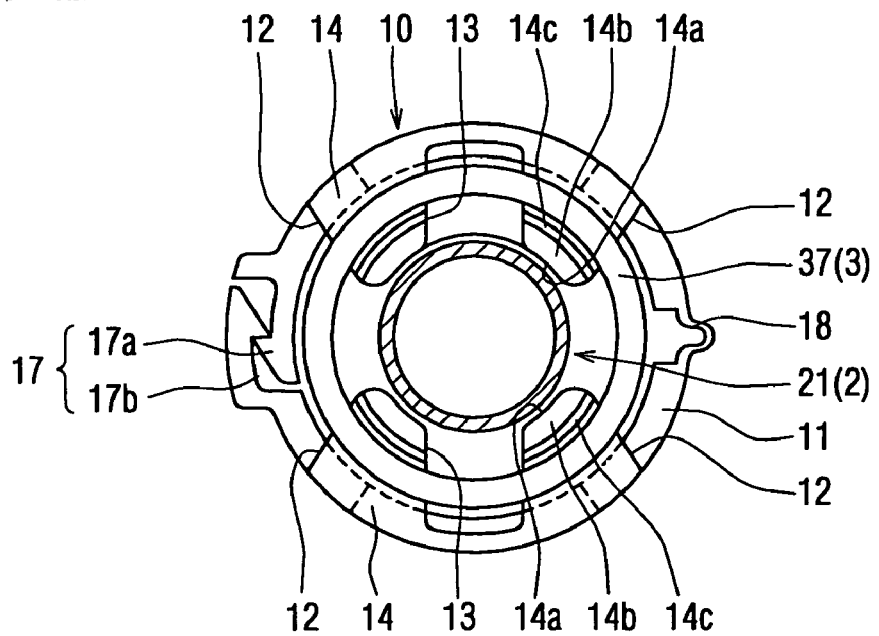
FIG. 2 is a side view showing the piping joint structure viewed in an arrow direction II in FIG. 1.
Figure 3A:
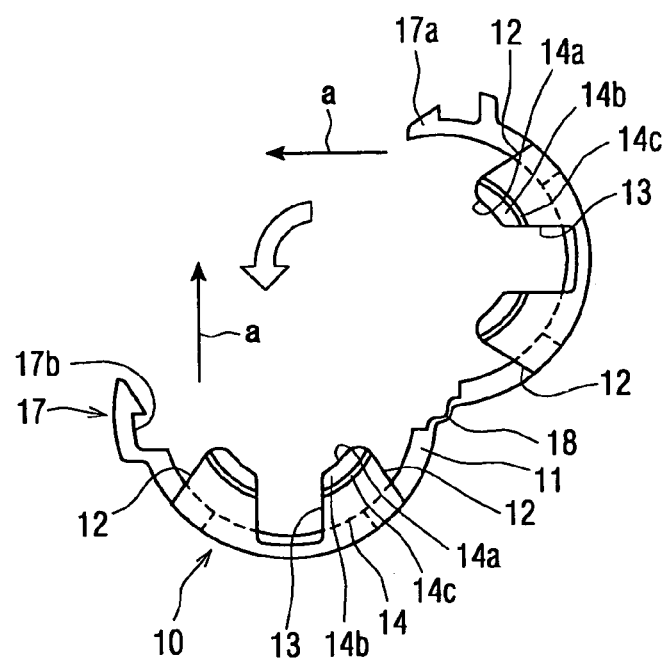
FIG. 3A is a side view showing a whole construction of a joint member 10 according to the first embodiment.
Figure 3B:
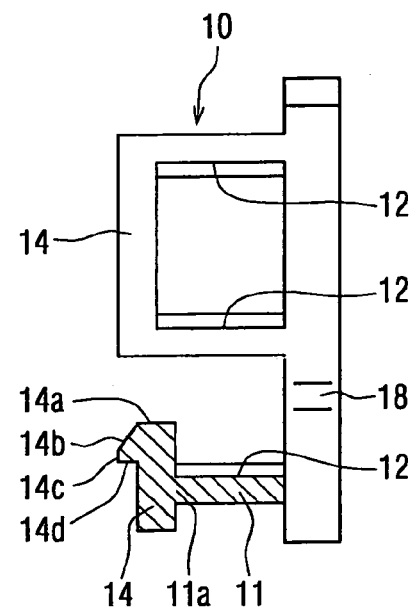
FIG. 3B is a partially cross-sectional view of the joint member 10.
Figure 4:
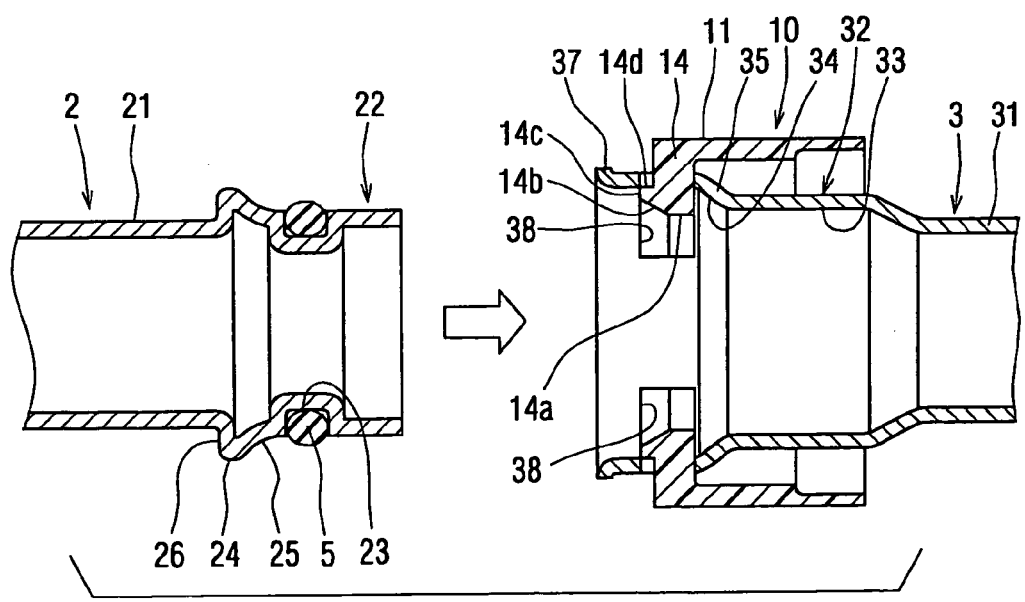
FIG. 4 is a cross-sectional view showing a first piping member 2 and a second piping member 3 before an insertion of the first piping member 2 into the second piping member 3 according to the first embodiment.

Referring to FIGS. 2, 3A and 3B, the joint member 10 is provided with a body unit 11, which has a semi-crack shape and can be looped to form a substantial cylinder when being closed (described later). The body unit 11 has a thin wall, being a dimension in a diameter direction thereof, and provided with multiple (e.g., two) slot portions 12 (first slot portions 12), each of which approximately axially extends from one axial end 11a of the body unit 11 to the neighborhood of the other axial end thereof and has an opening at the axial end 11a. That is, the first slot portion 12 axially extends to a part of the body portion 11 of the joint member 10. The first slot portions 12 are uniformly arranged at the body unit 11 with respect to the circumference direction thereof.

The body unit 11 is further provided with multiple (e.g., two) engagement units 14 (first engagement units 14), which are disposed at the axial end 11a of the body unit 11 at positions where the first slot portions 12 are not opened and protrude to the side of the central axis of the body unit 11. The opening of each of the first slot portions 12 at the axial end 11a is circumferentially sandwiched between the first engagement units 14. The first engagement units 14 are uniformly arranged at the body unit 11 with respect to the circumference direction thereof.

Each of the first engagement units 14 is provided with a slit 13, for example, at the approximately circumferential middle thereof, so that the first engagement unit 14 is divided into two parts. Thus, in this case, the first engagement units 14 arranged at the axial end 11a of the body unit 11 total to four.

Referring to FIG. 3B showing an axial partial cross section of the joint member 10, each of the first engagement unit 14 is provided with a thickness-enlarged part at a protruding-direction end thereof disposed at the diametrically inner side of the body unit 11. Here, the thickness is a dimension in the axis direction of the body portion 11, that is, a dimension in a direction perpendicular to the protruding direction of the first engagement unit 14.

The thickness-enlarged part of the first engagement unit 14 includes a bulge portion 14c bulging to the side of the first piping member 2, and a taper portion 14b, which tapers from the bulge portion 14c to a surface of one protruding-direction (of first engagement unit 14) end of the thickness-enlarged part (first engagement unit 14). This surface (line portion 14a) has, for example, an approximate arc shape, and is disposed at the diametrically inner side of the body unit 11. A step-height surface 14d is formed at the other protruding-direction (of first engagement unit 14) end of the thickness-enlarged part, that is, at the diametrically outer side of the body unit 11 with respect to the line portion 14a.

The joint member 10 including the first engagement unit 14 is elastic in both the axial direction and the diametrical direction thereof, and made of, for example, a resin, a metal, or a compound of a metal and a resin. The joint member 10 is constructed to have the semi-crack shape, referring to FIGS. 2, 3A and 3B. That is, one diametrical end (connection end) of the body unit 11 of the joint member 10 is integrally constructed, while the other diametrical end (separation end) thereof is constructed to have two separate portions, which can be disengageably connected with each other so that the joint member 10 is closed to have the cylinder shape.

Specifically, the body unit 11 is provided with an elastic hinge unit 18 integrally formed with the body unit 11 at the connection end thereof, and an engagement unit 17 disposed at the separation end thereof to face the hinge unit 18 with respect to the central axis of the body unit 11.

The engagement unit 17 includes a first engagement portion 17a (e.g., convex portion) and a second engagement portion 17b (e.g., concave portion), which are respectively arranged at the two separate portions of the separation end of the body unit 11 and can be disengageably engaged with each other. The convex portion 17a has, for example, an approximate hook shape, and the concave portion 17b has a shape corresponding to that of the convex portion 17a.

Accordingly, the joint member 10, being in an open state where the convex portion 17a is disengaged from the concave portion 17b, can hoop (ring) the second piping member 3 from the periphery side of the second piping member 3. Thereafter, the convex portion 17a is engaged with the concave portion 17b, so that the joint member 10 is looped. That is, the joint member 10 is closed to have the whole cylinder shape, and attached to the second piping member 3.

In this case, the engagement unit 17 and the hinge unit 18 are respectively arranged at the two diametrical ends (separation end and connection end) of the body unit 11, for example, at positions to which the first slot portions 12 do not extend. That is, the two first slot portions 12 axially partially extend to the body unit 11, and the engagement unit 17 and the hinge unit 18 are respectively located at axial ends of the two first slot portions 12.

Next, the connection of the first piping member 2 and the second piping member 3 will be described with reference to FIGS. 1, 4A, 4B and 5.

At first, the joint member 10, being in the opening state, hoops the second piping member 3 from the periphery side of the second piping member 3, while the first engagement units 14 are inserted through the window portions 38 of the second piping member 3 from the periphery side to the side of a central axis of the second piping member 3. Thereafter, the convex portion 17a is engaged with the concave portion 17b, so that the joint member 10 is looped to be attached to the second piping member 3.

Then, the male joint 22 of the first piping member 2 is inserted to the female joint 32 of the second piping member 3. When the diameter-enlarged portion 24 and the taper outer surface 25 of the male joint 22 contact and push the taper portions 14b of the first engagement units, the first engagement units 14 are diameter-enlarged with a fulcrum of the body unit 11 to tend to be detached (extruded) from the window portions 38 of the second piping member 3. Here, diameter-enlarging of the first engagement units 14 means an enlarging of the distance (in diameter direction of body unit 11) between the first engagement units 14, which are symmetric to each other with respect to the central axis of the body unit 11.

Figure 5:
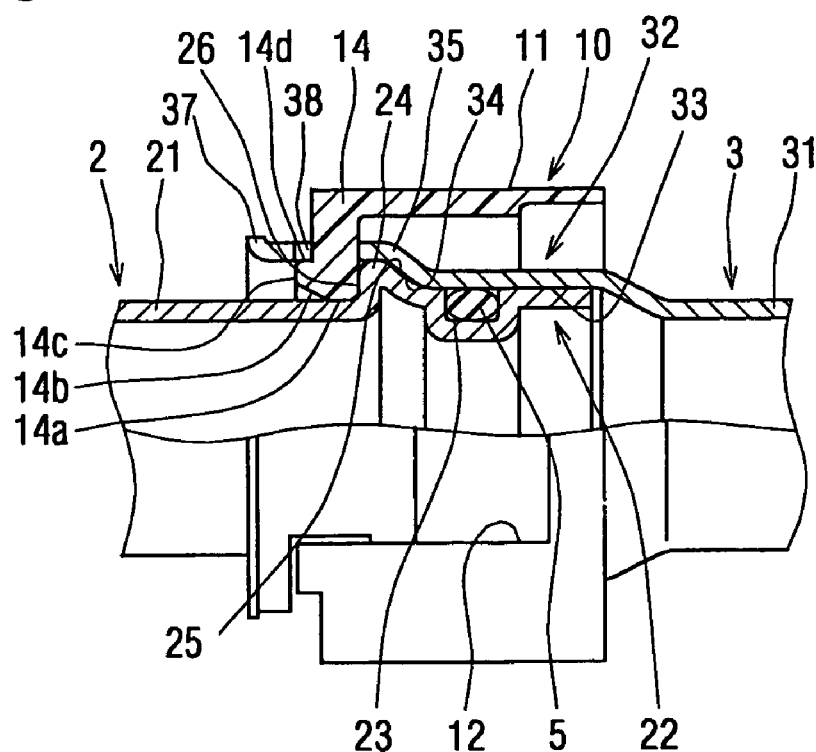
FIG. 5 is a cross-sectional view showing a connection state of the first piping member 2 and the second piping member 3 according to the first embodiment.

Then, as shown in FIG. 5, while the male joint 22 is further inserted to the side of the female joint 32, the taper outer surface 25 of the male joint 22 will contact the taper inner surface 34 of the female joint 32. The axial end (of side of second piping member 3) of the male joint 22 is accommodated in the insertion port 33 of the second piping member 3 and engaged with the inner surface thereof. Thus, the first engagement units 14 elastically return to the window portion 38, so that the distance between the first engagement units 14 having been enlarged is shortened, that is, the first engagement units 14 are diameter-shortened.

Then, a side surface of the first engagement unit 14 is engaged with the rear engagement surface 26 disposed at the end (of opposite side to second piping member 3) of the diameter-enlarged portion 24 of the male joint 22, while the line portion 14a of the first engagement unit 14 is engaged with an outer surface of the cylinder portion 21 of the first piping member 2. The side surface of the first engagement unit 14 is approximately parallel to the protruding direction of the first engagement unit 14 and disposed at the side of the second piping member 3.

Accordingly, the first engagement unit 14 is engaged with the first piping member 2 through the window portion 38 of the second piping member 3. Thus, the first piping member 2 is connected with the second piping member 3 by a one-touch operation (diameter-enlarging and diameter-shortening of first engagement units 14).

Referring to FIG. 1, when fluid is provided and sealed in the first piping member 2 and the second piping member 3, the pressure (inner pressure) therein will increase so that the first piping member 2 is axially displaced. In the case where the first piping member 2 is displaced to an opposite side to the second piping member 3, the side surface of the first engagement unit 14, which has been engaged with the rear engagement surface 26 of the first piping member 2, is axially displaced and disengaged from it. Thus, the bulge portion 14c, bulging to the side of the first piping member 2, of the first engagement unit 14 will contact (engaged with) the window portion 38, while the step-height surface 14d of the first engagement unit 14 will contact an inner surface of the extension portion 37 of the second piping member 3. Therefore, the first engagement unit 14 remains to be engaged with the window portion 38.

Accordingly, based on this embodiment, the first piping member 2 is restricted from disengaging from the second piping member 3 when fluid is remained therein and the inner pressure is high. In the case where there is no fluid remained in the first and second piping members 2, 3 so that the inner pressure disappears, the first and second piping members 2 and 3 can be detached from each other.

In this embodiment, when the male joint 22 is inserted through the first engagement unit 14, the line portion 14a of the first engagement unit 14 will press-contact the seal unit 5 arranged at the male joint 22, so that the seal unit 5 is diameter-shortened and the first engagement unit 14 is diameter-enlarged. Therefore, the seal unit 5 may be damaged by a protrusion part such as a burr at the line portion 14a.

Figure 6A:
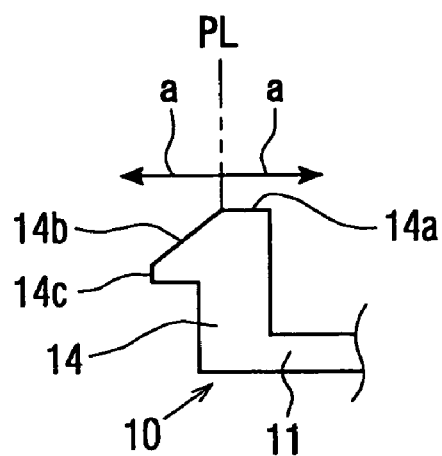
FIG. 6A is a schematic view showing a relation between a parting surface and a pattern-draw direction of a form block of a joint member with a ring shape in a comparison example.

FIG. 6A shows a parting surface 'PL' and a pattern-draw direction 'a' of a form block in a molding of the joint member 10 with a ring shape in a comparison example. In this case, the pattern-draw direction 'a' is approximately perpendicular to the protruding direction of the first engagement unit 14, and the parting surface 'PL' contacts the taper portion 14b and the line portion 14a of the first engagement unit 14, so that the burr or the like may be caused at the line portion 14a.

Figure 6B:
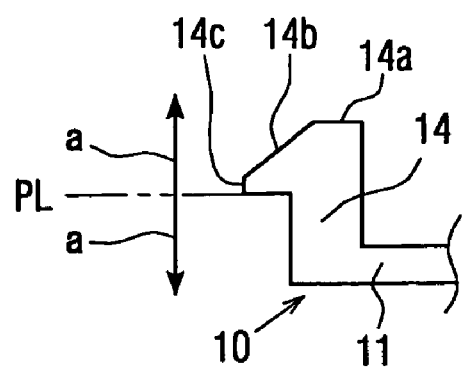
FIG. 6B is a schematic view showing a relation between a parting surface and a pattern-draw direction of a form block of the joint member 10 according to the first embodiment.

According to the present invention, because the joint member 10 is set to have the semi-crack shape, the parting surface 'PL' of the form block can be arranged apart from the line portion 14a, for example, as shown in FIG. 6B. In this case, the pattern-draw direction 'a' of the form block is displaced to be approximately parallel to the protruding direction of the first engagement unit 14. Therefore, the burr and the like can be restricted from forming at the line portion 14a in the molding of the joint member 10. Thus, the seal unit 5 can be prevented from being damaged when the male joint 22 is inserted through the first engagement unit 14.

In this embodiment, the single groove 23, in which the seal unit 5 is inserted, is formed at the male joint 22 of the first piping member 2. However, a plurality of the grooves 23 can be also arranged at the male joint 22 and a plurality of the seal units 5 are respectively inserted in the grooves 23, thus sealing the connection part of the first and second piping members 2, 3.

Moreover, in this embodiment, the slit 13 is arranged at the approximately circumferential middle of each of the first engagement units 14 to divide it into the two parts. However, the slit 13 can be also omitted.

According to the first embodiment, the piping joint structure is provided with the joint member 10 having the semi-crack shape. Thus, the joint member 10 is capable of encircling (hooping) the second piping member 3 from the periphery side of the second piping member 3, while the first engagement unit 14 can be inserted through the window portion 38 from the periphery side of the second piping member 3 to the side of the central axis of the second piping member 3. Then, the joint member 10 is detachably engaged with (attached to) the second piping member 3.

In this case, the joint member 10 is provided with the convex portion 17a and the concave portion 17b, which are respectively arranged at the two separate portions of the separation end of the body unit 11 and can be disengageably engaged with each other. Moreover, the joint member 10 is provided with the hinge unit 18, which faces the engagement unit 17 with respect to the central axis of the body unit 11. Therefore, the joint member 10 can be readily attached to and detached from the second piping member 3.

Based on the piping joint structure, the attachment of the joint member 10 to the second piping member 3 becomes significantly more easily, as compared with a conventional attachment where the first engagement unit 14 is diameter-enlarged so that the second piping member 3 is inserted therein. According to this embodiment, the joint member 10 can be attached to the second piping member 3 without diameter-enlarging the first engagement unit 14 which is elastic, thus preventing a faultiness of the first engagement unit 14 due to a deformation exceeding an elastic deformation range thereof.

Furthermore, in the molding of the joint member 10, the pattern-draw direction 'a' of the form block is set to be approximately parallel to the protruding direction of the first engagement unit 14, and the parting surface 'PL' of the form block is apart from the line portion 14a of the first engagement unit 14. Thus, the burr and the like can be restricted from forming at the line portion 14a. Accordingly, the seal unit 5 can be prevented from being damaged when the first piping member 2 is inserted into the second piping member 3.

(Second Embodiment)

In the above-described first embodiment, the joint member 10 having the semi-crack shape is provided with the elastic hinge unit 18 integrally formed at the connection end thereof, which faces the separation end of the joint member 10. According to a second embodiment, the joint member 10 is constructed to have two separate parts with respect to the circumference direction of the joint member 10. The two separate parts can be disengageably connected with each other responding to requirement.

Figure 7:
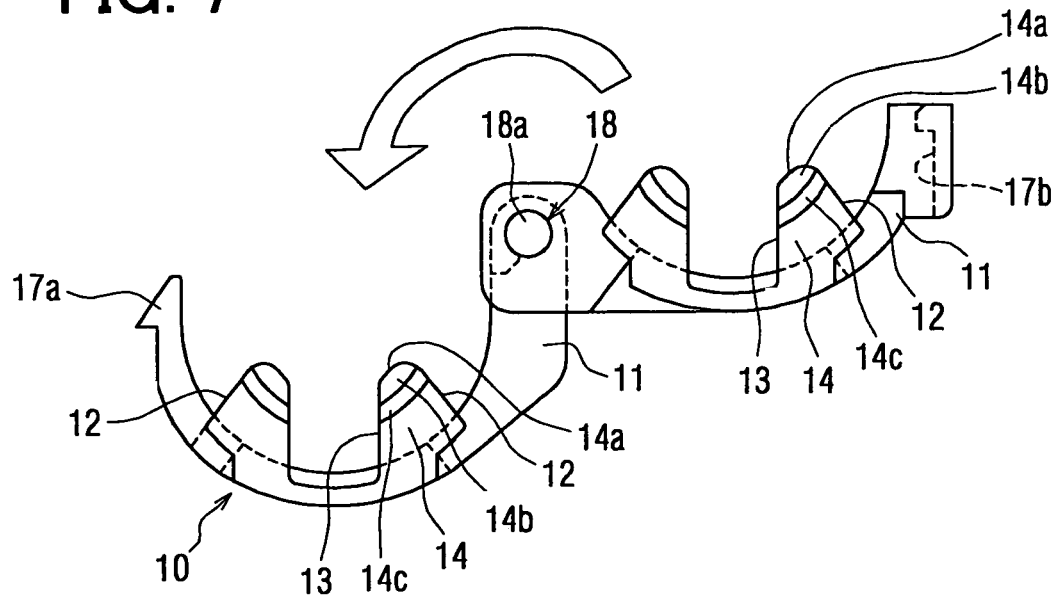
FIG. 7 is a side view showing a whole construction of a joint member 10 according to a second embodiment of the present invention.

Specifically, as shown in FIG. 7, the one part of the joint member 10 is provided with, for example, the hook-shaped convex portion 17a and the hinge unit 18, which are separately located at two circumferential ends thereof. The other part of the joint member 10 is provided with the concave portion 17b and the additional hinge unit 18, which are separately located at two circumferential ends thereof. That is, the two parts of the joint member 10 are respectively provided with the two hinge portions 18, which can be integrally connected with each other through a pin 18a, for example, so that the joint member 10 is constructed to have the semi-crack shape. The concave portion 17b can be disengageably engaged with the convex portion 17a.

Accordingly, similarly to the first embodiment, the joint member 10 can be attached to the second piping member 3 without diameter-enlarging the first engagement unit 14 of the joint member 10. Thus, the joint member 10 can be readily attached to and detached from the second piping member 3.

Figure 8:
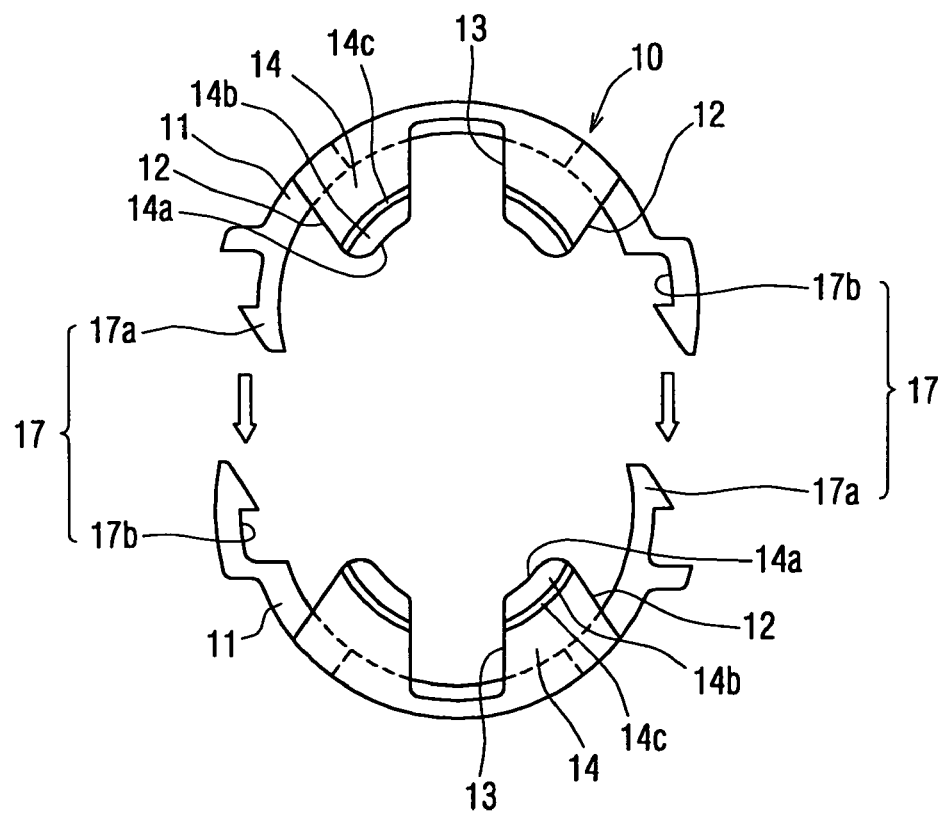
FIG. 8 is a side view showing a whole construction of a joint member 10 according to a modification of the second embodiment.

In this embodiment, the joint member 10 having the semi-crack shape is provided with the two separate parts, which are respectively provided with the hinge portions 18 capable of being integrally connected with each other. The joint member 10 can be also provided with a pair of the engagement units 17, each of which includes the hook-like convex portion 17a and the concave portion 17b, as shown in FIG. 8. The convex portion 17a and the concave portion 17b of each of the engagement units 17 are respectively arranged at the two circumferential ends of each of the two parts of the joint member 10. The convex portion 17a arranged at the one part can be engaged with the concave portion 17b arranged at the other part of the joint member 10, so that the joint member 10 is integrally connected.

The construction of the piping joint structure which has not been described in the second embodiment is the same with the first embodiment.

(Third Embodiment)

In the above-described embodiments, the second piping member 3 is provided with the extension portion 37 at the side of the first piping member 2. The extension portion 37 is provided with the window portions 38 extending in the circumferential direction of the extension portion 37. The first engagement unit 14 is inserted through the window portions 38. According to a third embodiment, the extension portion 37 (including window portions 38) of the second piping member 3 will be omitted.

Figure 9:
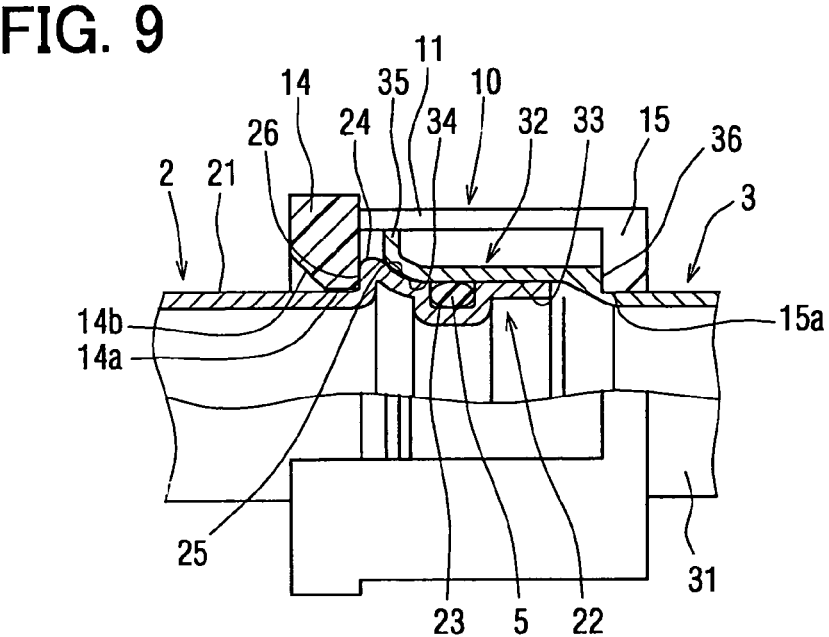
FIG. 9 is a partially cross-sectional view showing a whole construction of a piping joint structure according to a third embodiment of the present invention.

In this case, the first piping member 2 has the same construction with the first and second embodiments. Referring to FIG. 9, the second piping member 3 includes the cylinder portion 31 provided with the diameter-enlarged portion (female joint 32), which is disposed at the end of the second piping member 3 of the side of the first piping member 2.

The female joint 32 has the cylinder-shaped insertion port 33, in which the male joint 22 of the first piping member 2 is inserted. The end of the insertion port 33 of the side of the first piping member 2 is further diameter-enlarged to construct the taper portion 35 having the taper inner surface 34. The female joint 32 has an axial end (of an opposite side to first piping member 2), an outer surface of which will be engaged with second engagement units 15 arranged at the joint member 10. This outer surface (engagement surface 36) is a step-high surface with respect to the cylinder portion 31 of the second piping member 3.

According to the second embodiment, the body unit 11 of the joint member 10 is additionally provided with the two second engagement units 15 at the axial end thereof opposite to the axial end 11a, where the first engagement units 14 are arranged. The second engagement units 15, being symmetrically to each other with respect to the central axis of the joint-member 10, respectively protrude to the side of the central axis of the joint member 10. The second engagement unit 15 has a protruding-direction end surface (line portion 15a), which is disposed at the diametrically inner side of the joint member 10.

Figure 10:
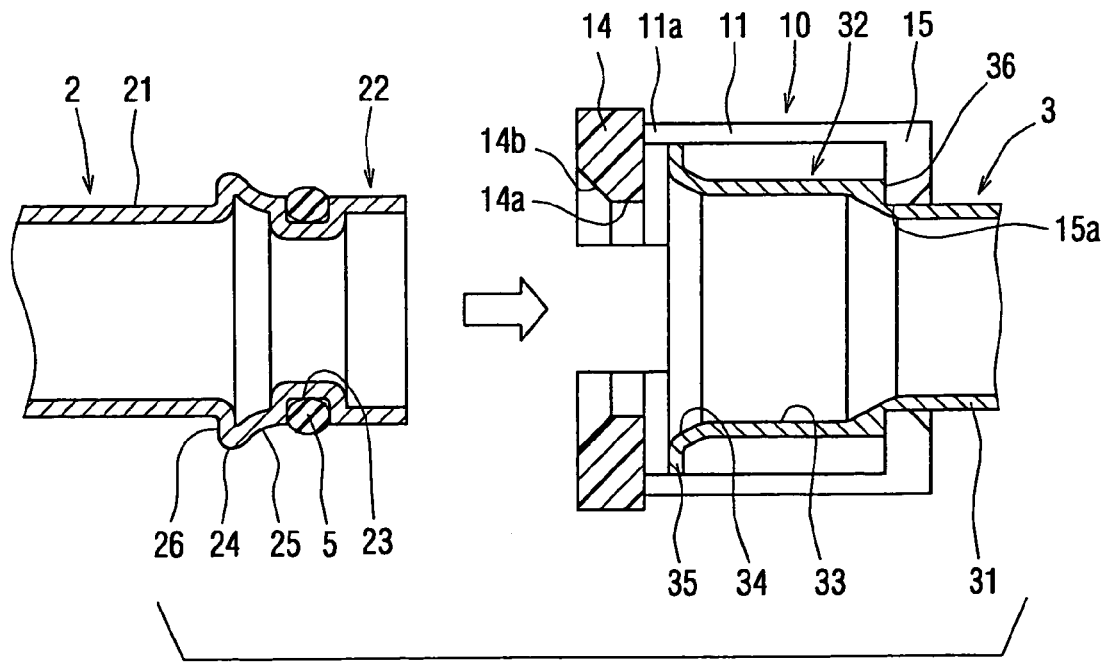
FIG. 10 is a cross-sectional view showing a first piping member 2 and a second piping member 3 before an insertion of the first piping member 2 into the second piping member 3 according to the third embodiment.

Referring to FIG. 10, the joint member 10 will be attached to the second piping member 3. In this case, the line portion 15a of the second engagement unit 15 is engaged with the outer surface of the cylinder portion 31 of the second piping member 3, while a side surface (at the side of first piping member 2) of the second engagement units 15 will contact the engagement surface 36 of the second piping member 3. The side surface of the second engagement unit 15 is approximately parallel to the protruding direction of the second engagement unit 15.

Then, the male joint 22 of the first piping member 2 is inserted to the female joint 32 of the second piping member 3, so that the diameter-enlarged portion 24 and the taper outer surface 25 of the first piping member 2 contact and push the taper portion 14b of the first engagement unit 14. Thus, the first engagement unit 14 is diameter-enlarged with a fulcrum of the body unit 11 to tend to be detached from the second piping member 3.

As shown in FIG. 9, when the male joint 22 is inserted to the further inner side of the female joint 32, the taper outer surface 25 of the first piping member 2 will contact the taper inner surface 34 of the taper portion 35, so that the first engagement unit 14 elastically returns, that is, is diameter-shortened (as defined in first embodiment). Thus, the side surface (approximately parallel to the protruding direction of first engagement unit 14) of the first engagement unit 14 is engaged with the rear engagement surface 26 of the first piping member 2, while the line portion 14a of the first engagement unit 14 is engaged with the outer surface of the cylinder portion 21 of the first piping member 2.

Thus, the male joint 22 of the first piping member 2 is inserted into the female joint 32 of the second piping member 3, so that the axial end portion of the male joint 22 is accommodated in the insertion port 33 of the second piping member 3. The first and the second piping members 2, 3 are axially restrained by each other.

According to the piping joint structure described in the third embodiment, the first piping member 2 can be connected to the second piping member 3 by a one-touch operation (diameter-shortening and diameter-enlarging of first engagement unit 14).

The construction of the piping joint structure which has not been described in the third embodiment is the same with the first embodiment.

(Other Embodiment)

Although the present invention has been fully described in connection with the preferred embodiments thereof with reference to the accompanying drawings, it is to be noted that various changes and modifications will become apparent to those skilled in the art.

In the above-described embodiments, the joint member 10 is provided with the first slot portions 12, which axially extend from the one axial end 11a to a part of the joint member 10 and respectively have the openings at the axial end 11a. However, the joint member 10 can be also additionally provided with second slot portions, which axially extend from the other axial end of the joint member 10 to a part thereof and respectively have openings at the other axial end. The circumferential positions of the second slot portions at the joint member 10 are stagger with those of the first slot portions 12, and each of the second slot portions is arranged between the two first slot portions 12 in the circumference direction of the joint member 10.

In this case, the joint member 10 is further provided with second engagement units, which are arranged at the other axial end thereof at the positions where the openings of the second slot portions are not arranged. That is, the second engagement units and the first engagement units 14 are separately arranged at the two axial ends of the joint member 10. The second engagement unit protrudes to the side of the central axis of the joint member 10, and will be engaged with the second piping member 3 (cylinder portion 31).

In the above-described embodiments, the piping joint structure is suitably used for the piping members of the refrigerant cycle of the vehicle air conditioner. However, the piping joint structure according to the present invention can be also used for other pipes in which fluid is sealed.

Such changes and modifications are to be understood as being in the scope of the present invention as defined by the appended claims.

What is claimed is:

1. A piping joint structure, comprising:
   a first piping member having a male joint;
   a second piping member having a female joint; and
   a joint member including a body unit with an approximate cylinder shape and a plurality of engagement units, which are disposed at an axial end of the body unit and protrude to a side of a central axis of the body unit, the engagement units being elastic at least in a protruding direction thereof, wherein:
   the body unit of the joint member has a plurality of slot portions, each of which has an opening at the axial end of the body unit and approximately axially extends to a part of the body unit, the slot portions being uniformly arranged at the body unit with respect to a circumference direction thereof and having the openings disposed where the engagement units are not arranged;
   the body unit of the joint member has two diametrical ends, at least one of which is divided into two separate portions capable of being disengageably connected with each other;
   the joint member hoops an outer surface of the second piping member; and
   the male joint of the first piping member is inserted into the female joint of the second piping member by a one-touch operation of diameter-enlarging and diameter-shortening of the engagement units.

2. The piping joint structure according to claim 1, wherein:

one of the diametrical ends of the body unit is divided into the two separate portions; and the body unit of the joint member further has a first engagement portion and a second engagement portion, which are separately arranged at the two separate portions and capable of being disengageably engaged with each other.

3. The piping joint structure according to claim 2, wherein the body unit of the joint member further has a hinge unit disposed at an opposite side to the first engagement portion and the second engagement portion with respect to the central axis of the body unit.

4. The piping joint structure according to claim 2, wherein the first engagement portion is a convex portion and the second engagement portion is a concave portion.

5. The piping joint structure according to claim 1, wherein when the joint member is molded, a parting surface of a form block of the joint member is apart from a surface of a protruding-direction end of the engagement unit, the surface being disposed at a diametrically inner side of the body unit of the joint member.

6. The piping joint structure according to claim 1, wherein when the joint member is molded, a pattern-draw direction of a form block of the joint member is approximately parallel to the protruding direction of the engagement unit.

7. The piping joint structure according to claim 1, wherein the body unit of the joint member has a thin wall.

8. The piping joint structure according to claim 1, wherein each of the two diametrical ends of the body unit is divided into the two separate portions, which are separately provided with a first engagement portion and a second engagement portion capable of being disengageably engaged with each other.

9. A piping joint structure, comprising:

a first piping member having a male joint;

a second piping member having a female joint, which has at least a window portion extending in a circumferential direction thereof; and a joint member including a body unit with an approximate cylinder shape and a plurality of engagement units, which are arranged at an axial end of the body unit and protrude to a side of a central axis of the body unit, the engagement units being elastic at least in a protruding direction thereof, wherein:

the body unit of the joint member has a plurality of slot portions, each of which has an opening at the axial end of the body unit and approximately axially extends to a part of the body unit, the slot portions being uniformly arranged at the body unit with respect to a circumference direction thereof and having the openings disposed where the engagement units are not arranged;

the body unit has two diametrical ends, at least one of which is divided into two separate portions capable of being disengageably connected with each other;

the joint member hoops the second piping member while the engagement units of the joint member are inserted through the window portion from a periphery side of the second piping member to a side of a central axis of the second piping member, so that the joint member is attached to the second piping member; and the male joint of the first piping member is inserted into the female joint of the second piping member by a one-touch operation of diameter-enlarging and diameter-shortening of the engagement units.

10. The piping joint structure according to claim 9, wherein:

one of the diametrical ends of the body unit is divided into the two separate portions; and the body unit of the joint member further has a first engagement portion and a second engagement portion, which are separately arranged at the two separate portions and capable of being disengageably engaged with each other.

11. The piping joint structure according to claim 9, wherein when the joint member is molded, a parting surface of a form block of the joint member is apart from a surface of a protruding-direction end of the engagement unit, the surface being disposed at a diametrically inner side of the body unit of the joint member.

12. The piping joint structure according to claim 9, wherein when the joint member is molded, a pattern-draw direction of a form block of the joint member is approximately parallel to the protruding direction of the engagement unit.

* * * * *